(12) United States Patent
Layman et al.

(10) Patent No.: US 9,729,347 B2
(45) Date of Patent: Aug. 8, 2017

(54) SYSTEM AND METHOD FOR SELECTION OF A CONFERENCE BRIDGE MASTER SERVER

(71) Applicant: Vonage Business Solutions, Inc., Atlanta, GA (US)

(72) Inventors: Randy Layman, Marietta, GA (US); Barry Fleming, Roswell, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 45 days.

(21) Appl. No.: 14/194,220

(22) Filed: Feb. 28, 2014

(65) Prior Publication Data

US 2015/0249547 A1 Sep. 3, 2015

(51) Int. Cl.
*H04L 12/16* (2006.01)
*H04L 12/46* (2006.01)
*H04L 29/06* (2006.01)
*H04L 12/26* (2006.01)

(52) U.S. Cl.
CPC ........ *H04L 12/462* (2013.01); *H04L 12/4625* (2013.01); *H04L 43/062* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 7,298,834 B1 * | 11/2007 | Homeier | H04M 3/56 370/259 |
| 8,374,106 B2 | 2/2013 | Whitney et al. | |
| 8,675,524 B2 * | 3/2014 | Karam | H04L 65/1046 348/14.09 |
| 9,167,011 B2 * | 10/2015 | Ellison | H04L 65/403 |
| 2006/0274675 A1 * | 12/2006 | Kizhnerman | H04L 47/10 370/254 |
| 2009/0268008 A1 * | 10/2009 | Topits | H04M 3/567 348/14.09 |
| 2010/0165889 A1 * | 7/2010 | Madabhushi | H04M 3/2227 370/261 |

* cited by examiner

*Primary Examiner* — Kwang B Yao
*Assistant Examiner* — Juvena Loo
(74) *Attorney, Agent, or Firm* — Alexander Legal LLC; Joseph Pagnotta

(57) ABSTRACT

A system and method are disclosed herein for managing conference bridge communication sessions. The system and method involves receiving a plurality of calls containing user media from users into a conference bridge, then connecting the plurality of calls via a load balancer to a plurality of conference servers on a network. A master broker dynamically selects a master conference server from among the plurality of conference servers to which the calls are connected. Once the master conference server is selected, the master broker directs all other conference servers to bridge the user media for the calls that are connected to the master conference server. The master conference server receives the user media from each of the connected conference servers. The master conference server is able to organize and mix the various user media and return this mixed media to each of the connected conference servers and thereby back to each user.

12 Claims, 4 Drawing Sheets

SYSTEM AND METHOD FOR SELECTION OF A CONFERENCE BRIDGE MASTER SERVER

FIELD OF THE INVENTION

The present invention relates generally to conference bridge communications and, more particularly, to methods and systems for dynamically selecting a master server for a conference bridge communication.

BACKGROUND OF THE INVENTION

Conference communications, namely the capability for more than two parties to simultaneously communicate, is a fundamental feature of audio and video electronic communications. Heretofore a variety of methods exist to enable conference communications, and all involve some method to receive and deliver communications media from and to the parties in conference. In some systems, all communications are simultaneously point-to-point, while in other systems all communications are hub-and-spoke where the hub handles receiving, mixing, and sending media for all parties. Mixing media is useful in the case of audio to simulate in-person communications in the cases where individual conference parties are speaking simultaneously.

Prior art systems typically assign a single hub for a master conference server. Furthermore, prior art systems do not allow master conference servers to be dynamically selected or dynamically allocated for various failover conditions. What is needed is a system and method for dynamically selecting a master conference server in real time that has the ability to adjust for failover conditions and other call-quality requirements.

The present invention meets one or more of the above-referenced needs as described herein in greater detail.

SUMMARY OF THE INVENTION

The present invention relates generally to conference bridge communications and, more particularly, to methods and systems for dynamically selecting a master server for a conference bridge communication. Briefly described, aspects of the present embodiments include the following.

In a first aspect, the present embodiment provides a system and method for selection of a conference bridge master server. The system and method includes a load balancer for connecting a plurality of calls to at least one of a plurality of conference servers for handling call media. The load balancer receives a plurality of calls, wherein a first call of the plurality of calls contains first call media, a second call of the plurality of calls contains second call media, and the first call and the second call are each directed to a conference bridge. A master broker is provided for selecting a master conference server. The master conference server is selected from among the plurality of conference servers to which the plurality calls are connected. The master broker is configured for directing all the other conference servers to bridge their call media to the master conference server. The master conference server is configured for providing communication services including organizing and mixing the call media from each of the conference servers to facilitate a conference bridge communication session.

In still a further aspect, the present embodiments disclose that the master broker relies on load metrics monitored on each of the conference servers in selecting the master conference server. The master broker may also rely upon quality performance metrics monitored on each of the conference servers to select the master conference server. Furthermore, the selection of the master conference server by the master broker relies on geo-location information of each conference server or each connected user.

In a further embodiment the master conference server may be dynamically changed by the master broker during a conference bridge communication session based upon load metrics monitored on the master conference server and each of the other conference servers. In still another embodiment the master conference server may be dynamically changed by the master broker during a conference bridge communication session based upon quality performance metrics monitored on the master conference server and each of the other conference servers.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
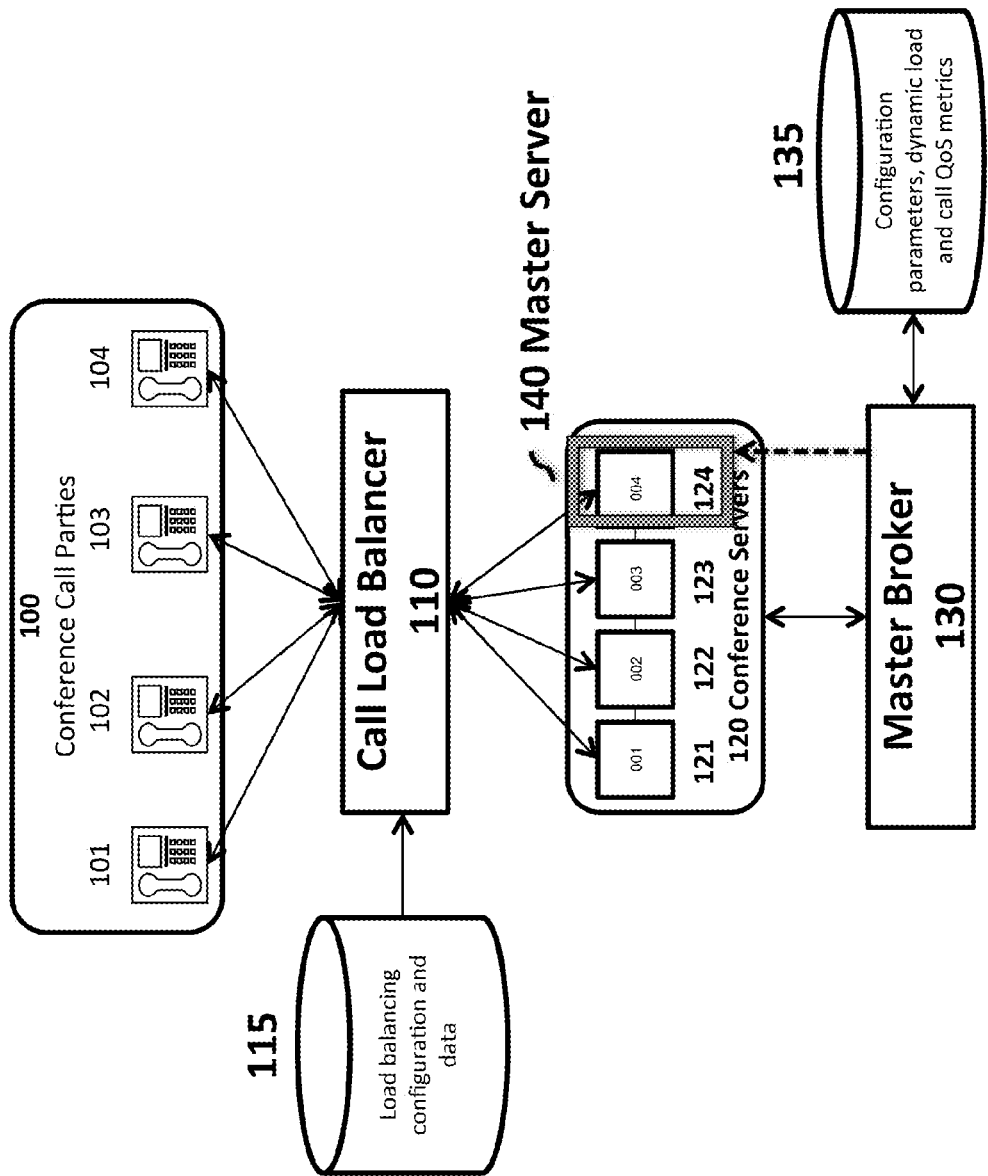
FIG. 1 is a block diagram of an exemplary embodiment of a system for dynamically selecting a conference bridge master.

Before the present methods and systems are disclosed and described in greater detail hereinafter, it is to be understood that the methods and systems are not limited to the disclosed methods, components, or implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. "Optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and are not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed herein are components that can be used to perform the disclosed methods and systems. It is understood that when combinations, subsets, interactions, groups, etc. of these components are disclosed that although specific reference to each various individual and collective combinations and permutations cannot be explicitly disclosed, each is specifically contemplated and incorporated herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to block and flowchart diagrams of methods, systems, apparatuses and computer program products. It will be understood that each block of the block diagrams and flowchart diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks contained in the block diagram and flowchart diagrams support combinations of means for performing the specified functions, combinations of steps for performing the specified functions and program instruction means for performing the specified functions. It will also be understood that each block of the block diagram and flowchart diagrams, and combinations of blocks in the block diagram and flowchart diagrams, can be implemented by special purpose hardware-based computer systems that perform the specified functions or steps, or combinations of special purpose hardware and computer instructions.

FIG. 1 is a block diagram that details the various aspects of an exemplary embodiment in which the present methods and systems can operate. FIG. 1 illustrates a block diagram for a system 100 for a dynamic selection of a conference communications master server. In a communications system with conference communication capabilities, a user or a party to a conference call initiates a connection to the conferencing system. This can be done, for example, by the user dialing a phone number and perhaps entering other information such as an identification number to connect to a conference bridge. Alternately, a user, through a computer application interface, for example, might click on a button in a form, which could initiate an Internet protocol (IP) communication to the conference bridge system. The conference call might be an audio only conference, in which case the user might be speaking and listening through a device such as a voice over Internet protocol (VoIP) phone; or the conference call might involve other capabilities such as video or computer application sharing along with the audio conferencing.

In an exemplary embodiment, one or more parties 101-104 to a conference call attempt to initiate a connection to the conferencing system 100. Each call attempt by the one or more parties 101-104 to the conference call is routed via a Call Load Balancer 110 to one or more Conference Servers 120. At least one of the individual Conference Servers 121-124 is dynamically selected by a Master Broker 130 to become the conference Master Server 140 for managing the conference call.

Further in FIG. 1, each of the conference call parties 101-104 represents one or more users accessing the conferencing system 100 via a VoIP phone, land line phone, mobile phone, soft phone, computer chat sessions, and the like. Although only four conference call participants 101-104 are indicated in the diagram, there could potentially be unlimited greater or fewer number of conference participants. Each of the conference call parties 101-104 typically dials into a conference bridge phone number or some other unique conference identifier system, such as a conference uniform resource locator (URL) on a webpage. Furthermore, each of the individual calling parties 101-104 can be geographically distributed at any location or anywhere a communications medium is available. The conferencing system 100 directs and connects each individual conference call party 101-104 to a Call Load Balancer 110.

Each individual calling party 101-104 gets directed to a Call Load Balancer 110. The Call Load Balancer 110 is a communications networking method for distributing workloads across multiple computing resources, such as a computer server cluster, a computer cluster, network links, central processing units and the like.

A Call Load Balancer 110 is a computer networking method for distributing workloads across multiple computing resources, such as computers, a computer cluster, network links, servers, etc. Load balancing aims to optimize resource use, maximize throughput, minimize latency, and avoid overload of any one of the computing and communications resources. The load balancer is usually a software application that is listening on the port where external clients (e.g. conference call party) connect to access services. As external clients attempt to access services on a network, the Call Load Balancer 110 uses a selection algorithm to determine which of the available servers on the network is most capable of processing the external client's request. In an exemplary embodiment, the selection algorithm seeks to allocate new external client requests or calls across the available servers based on the various server's current load, capabilities, geo location, Domain Name System (DNS) addressing, and the like. Although the exemplary example relies on a Call Load Balancer 110 that directs the new external client requests or calls based on the active load at each individual server, any number of factors can be considered when distributing the incoming calls among the servers.

In an exemplary embodiment, the conference bridge number or resource URL will typically direct each individual conference call party to the same Call Load Balancer 110. However, depending on the call load, geo-location of the caller, type of calling device, etc., the call may be handled by a different Call Load Balancer 110. In an exemplary embodiment, all of the individual conference call parties connecting to the conference 101-104 are routed through the same Call Load Balancer 110. The Call Load Balancer 110 will attempt to distribute incoming conference call parties 101-104 to among one or more Conference Servers 121-124.

The Call Load Balancer 110 will balance the call load by distributing the incoming call from among the plurality of conference call parties 101-104 via one or more Conference Servers 121-124. The Conference Servers 120 are responsible for receiving communications from and sending communications directly to the individual conference call party's 101-104 specific communications device. For example, the Conference Servers 121-124 might be receiving and sending IP communications to an individual conference call party's 101-104 VoIP Phone. Each individual conference call party 101-104 is connected to an individual Conference Server 121-124. In an exemplary implementation this might mean that none of the individual conference call parties 101-104 are connected to the same Conference Server 121-124.

In addition to having the capabilities to send and receive network communications for a communications conference, the Conference Servers 120 may also have the capability to provide other or associated communication services to the individual conference parties 101-104. For example, the Conference Servers 120 have capabilities to record calls, including on demand when indicated by a user-initiated network or IP communication that identifies that call recording should start or stop.

All Conference Servers 120 are in communication across the computer network with a Master Broker 130. The Master Broker 130 is a component, which the Conference Servers 120 can notify or query when conference events occur, such as when conference communications are initiated or terminated by an individual conference call party 101-104, or when there is some kind of disruption or problem in conference communications. The Master Broker 130 may also have capabilities to monitor the system elements of the Conference Servers 120, such as their central processing unit (CPU) or memory usage or the number of concurrent processes or calls being handled by each individual Conference Server 121-124. The Master Broker 130 may also have capabilities to monitor other system components, or to read from other system monitoring components, in order to gather further information related to the performance of the Conference Servers 120, such as gathering network performance statistics from computer networking equipment or monitoring systems which might provide indicators for the conference communication quality experienced by each individual conference call party 101-104.

Furthermore, the Master Broker 130 may have its own or connected data storage system 135, such as a memory cache, a disk storage system, a database, or some combination of software and hardware systems that would allow the Master Broker 130 to store and retrieve information about the Conference Servers 120, the active conference call parties 101-104, conference communications, and any associated metrics such as load or performance metrics that the Master Broker 130 may be directly or indirectly able to gather, read, or receive from other components in the system. The Master Broker 130 may also read configuration data from the connected data storage system, which would be supplied by an administrator to identify how the Master Broker 130 should execute its logic.

Further in FIG. 1, the Master Broker 130 is responsible for selecting and designating a Master Conference Server 140 from among the Conference Servers 120 to which individual conference call parties are connected for each active conference communication. For the purposes of illustration, the Master Broker 130 has selected Conference Server 124 here, as the Master Conference Server 140. The Master Conference Server 140 is one of the Conference Servers 120 that, in addition to the specific communications capabilities and services it handles for the individual conference call party 101-104, can also handle bridging media among the various Conference Servers 121-123. In addition, as required, the Master Conference Server 140 also mixes media for all inter-party conference communications. In the exemplary embodiment, at least some of the Conference Servers 120 can also have the capabilities to act as the Master Conference Server 140. The Conference Servers 120 can also connect to any designated Master Conference Server 140, either through pre-established or dynamic network connections. Any single Conference Server 121-124 may simultaneously handle conference communications for multiple conferences or multiple conference call parties 101-104, and any single Conference Server 121-124 might serve as the Master Conference Server 140 provided it has such capabilities for one or more simultaneous conferences.

The Master Broker 130 may select and designate the Master Conference Server 140 by using pre-configured logic that might be controlled or affected by administrator configuration data. For example, the Master Broker 130 may be configured to designate as the Master Conference Server 121-124, the Conference Server 120, from among the individual conference call parties, that is associated with the first calling party to the conference that is not already acting as Master Conference Server 140 for any other conference communications. The Master Broker 130 may also select the Master Conference Server 140 by using any of the dynamic system data that it has received or stored. For example, in an exemplary embodiment, the Master Broker 130 might designate a Conference Server 121-124 that has the least number of concurrent communication sessions or it might select the Conference Server 121-124 whose network location or geography is determined optimal for network communications with the plurality of Conference Servers 121-124 involved. For example, in an exemplary embodiment, there may be four callers on the conference call. Three of these callers might be located in San Francisco, Calif., and the fourth member of the conference call might be located in Miami, Fla. Therefore, the Master Broker 130 would likely chose a Master Conference Server 140 from among the Conference Servers 121-124 that are located on the western coast of the United States, in San Jose, Calif. for example; versus selecting a Conference Server 121-124 that is located in Akron, Ohio, but associated with a conference caller from Miami, Fla. In a further embodiment, the Master Broker 130, might select a Master Conference Server 140 in Huntsville, Ala. for a conference call with five participants in Baton Rouge, La. and two participants in Birmingham, Ala. if current weather conditions indicate that there is inclement weather in Louisiana. Therefore, any number of factors could be involved in the dynamic selection of the Master Conference Server 140.

The Master Broker 130 may also dynamically change the selection of the Master Conference Server 140 during the conference communications. For example, in a further exemplary embodiment, if the Master Broker 130 determines call quality, load, or other performance metrics from a previously designated Master Conference Server 140 falls below previously determined performance thresholds, then the Master Broker 130 can select a new, alternate Master Conference Server 140 from among the plurality of Conference Servers 121-124.

When a Master Conference Server 140 is selected for a specific conference communication session, the Master Broker 130 communicates the identity and other necessary information such as the IP address of the Master Conference Server 140 to all the Conference Servers 120 associated with that conference communication session. This may be done through a variety of well-known computer network communication methods, such as network broadcast or communications data push or pull. The Master Broker 130 initiates or responds to communications from each conference server 120. This allows the master conference server 140 to bridge and mix the media that is being processed by each of the other conference servers 121-123.

Figure 2:
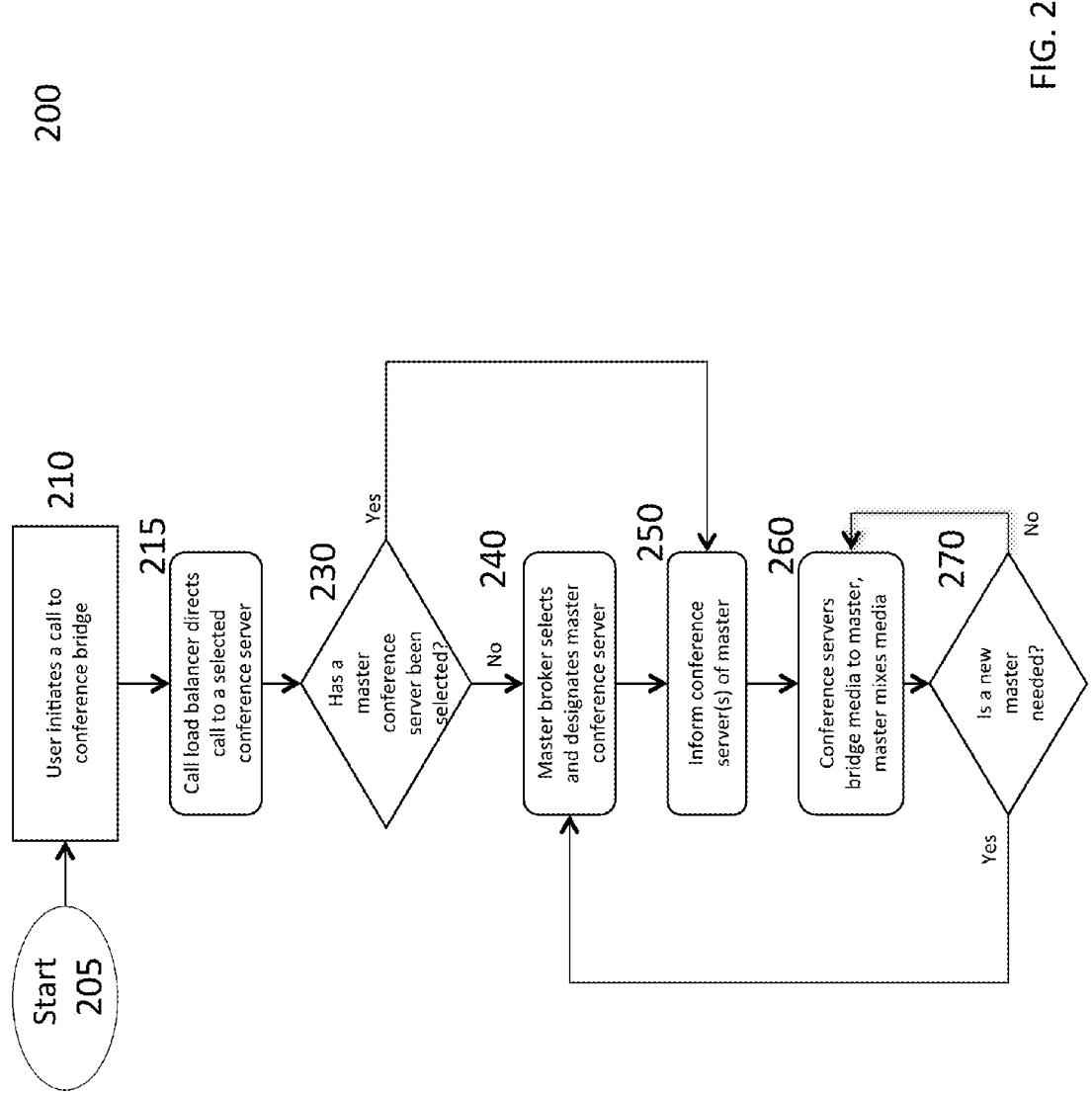
FIG. 2 is a flowchart of an exemplary embodiment of a method for dynamically selecting a conference bridge master.

Turning now to FIG. 2, a flow chart is provided for illustrating the method of providing a dynamic selection of a conference communications master server 200. The method starts at step 205. At step 210 one or more users, who are a party to the conference call, initiates a call to a conference bridge. As described in the discussion of FIG. 1 above, the conference call party 101-104 dials into a conference bridge number, clicks a conference URL, or initiates the communication with the conference via some other method. In an exemplary embodiment, a call request is made using a session initiation protocol (SIP) invite request. The SIP Invite request contains SIP credentials and conference identity (ID) information for the conference call. The SIP invite request goes to the Call Load Balancer 110 in step 215.

At step 215, the Call Load Balancer 110 receives the call and/or SIP Invite request from the one or more users participating in the conference call. If the conference authentication information is correct, the Call Load Balancer 110 begins the process of selecting a Conference Server 121-124 to anchor the call. The Call Load Balancer 110 may query a load balancing and configuration database or server 115 in order to determine which Conference Servers 120 are available and which of Conference Server 121-124 would be best to handle this particular call. In an exemplary embodiment, a Conference Server 121-124 that provides minimal latency (i.e. fast data transfer), high quality of service (QoS) metrics (e.g. minimal error rates, low transmission delay, low jitter, and larger bandwidth and throughput), and that is geographically close (based on the Internet Protocol address) to the conference call party 101-104 is selected. In fact, selection of the Conference Server 121-124 may be based on any number of performance, features and geographical factors. Once a Conference Server 121-124 is selected to anchor the call, a verification message containing the appropriate access credentials and communications routing information is provided to the conference call party's 101-104 SIP phone, mobile phone, computer, or other communications device. As other parties seek to join the conference, their devices are verified and anchored to a Conference Server 121-124 in a similar fashion. Once the Call Load Balancer 110 has anchored the conference calling party's 101-104 call to a Conference Server 120, the method moves on to step 230.

At step 230, the Conference Server 121-124 that was selected queries the Master Broker 130 at step 215 to get information regarding the conference call and to find out where the Master Conference Server 140 is located. In still another exemplary embodiment, a Master Conference Server 140 may be selected based on the type of conference that is being initiated. For example, a conference call that is audio only may require a different Master Conference Server 140 than a conference call that contains audio, video and data, because the selected Master Conference Server 140 must be able to handle all the types of media involved in the conference call. The Master Conference Server 140 may also be selected based on the its ability to communicate with certain other types of conference servers or even the type of device the conference calling party 101-104 is using to initiate the call, which for example, might involve using specific audio or video codecs and might require a Master Conference Server 140 capable of handling those codecs. If the Master Conference Server 140 has been selected, the method moves to step 250 where the Master Broker 130 provides the Conference Server 121-124 with address of the Master Server 140 and/or other access credentials. If no Master Server 140 has been selected, the method can select a new Master Server 140 from among the plurality of Conference Servers 121-124 based the features of each individual Conference Server 121-124 as discussed in to step 240 below.

At step 240, the Master Broker 130 dynamically selects and designates a Master Conference Server 140. The Master Broker 130 is able to make a selection of the Master Conference Server 140 by referencing information about conference servers 120 on the network. For example, as each one of the conference calling parties 101-104 calls into the network, their assigned Conference Server 120 can register their credentials and features with the Master Broker 130 and/or this information can be uploaded to a database 135. The database 135 contains information about each assigned conference server 120 and other components within the communications network. The database 135 may contain variety of analytical information including the type of Conference Servers 120 on the network, their features, current and past performance metrics, dynamic load, and call quality of services metrics and the like. The Master Broker 130 may also get information about individual conference servers 120 from a variety of means, including querying each conference server 120 for its features directly. The Master Broker 130 can also select and designate the Master Conference Server 140 by using pre-configured logic that might be controlled or affected by the analytical information available to it via one or more configuration databases 135. For example, if all of the Conference Servers 121-124 are similarly situated, the Master Broker 130 may be configured to designate as the Master Conference Server 140 the first Conference Server 121-124 that is not already acting as Master Conference Server 140 for any conference communications. The Master Broker 130 may also select the Master Conference Server 140 by using any of the dynamic system data that it has received or stored in the database 135. For example, the Master Broker 130 can designate from among the the Conference Servers 121-124, the conference server, conference server 121 for example, that has the least number of concurrent communication sessions, or it might select the Conference Server, conference server 124 for example, whose network location or geography is determined optimal for network communications with the plurality of Conference Servers 120 involved in the conference call. Once the Master Broker 130 selects a Master Conference Server 140 from among the plurality of Conference Servers 120, the Master Broker 130 begins informing and directing other conference call parties 101-104 to this Master Conference Server's location at step 250.

At step 250, once the Master Conference Server 140 is selected for a specific conference communication session, the Master Broker 130 communicates the identity, location and other necessary information such as the IP address of the Master Conference Server 140 to all the Conference Servers 121-124 associated with that conference call session. This may be done through a variety of well-known computer network communication methods, such as network broadcast or communications data push or pull. The Master Broker 130 initiates or responds to communications from each Conference Server 121-124, with the result being that Master Conference Server 140 is activated for media bridging and mixing. Each of the other Conference Servers 121-124 has the necessary network addresses or connections to the Master Conference Server 140 so that the means for bridging the conference communications media is provided. Once the Master Conference Server 140 is selected and other conference call parties 101-104 are notified, the method moves on to step 260.

At step 260, the Master Conference Server 140 bridges media from among the Conference Servers 120 and, when required, mixes media for all inter-party conference communications. In an exemplary embodiment, the Master Conference Server 140 mixes the various audio, video, data, and/or other media on the conference. The Conference Servers 120 are able to connect to any designated Master Conference Server 140, either through pre-established or dynamic network connections. The Master Conference Server 140 continues to manage the conference communications and media mixing until the conference call ends or until it is no longer designated the master. At step 270, a determination is made regarding the current Master Conference Server's 140 status as the master.

At step 270, at least one of the Master Broker 130, other network components or one of the conference servers 121-124, continually monitors performance metrics for all of the Conference Servers 120, and in particular, the Master Conference Server 140. Various network components measure call QoS metrics, network performance, dynamic load, and other analytical data so that this information can be stored in the database 135 and made available to the Master Broker 130. If at any point during the call, one or more of these performance metrics falls below a certain threshold, the Master Broker 130 can dynamically designate a new Master Conference Server 140 from among the plurality of Conference Servers 121-124 that are participating in the conference call network. Similarly if the Master Conference Server 140 fails for any other reason, a new master may also be selected at that time. Once it has been determined that a new Master Conference Server 140 is needed, the Master Broker 130 repeats steps 240-270 again.

Figure 3:
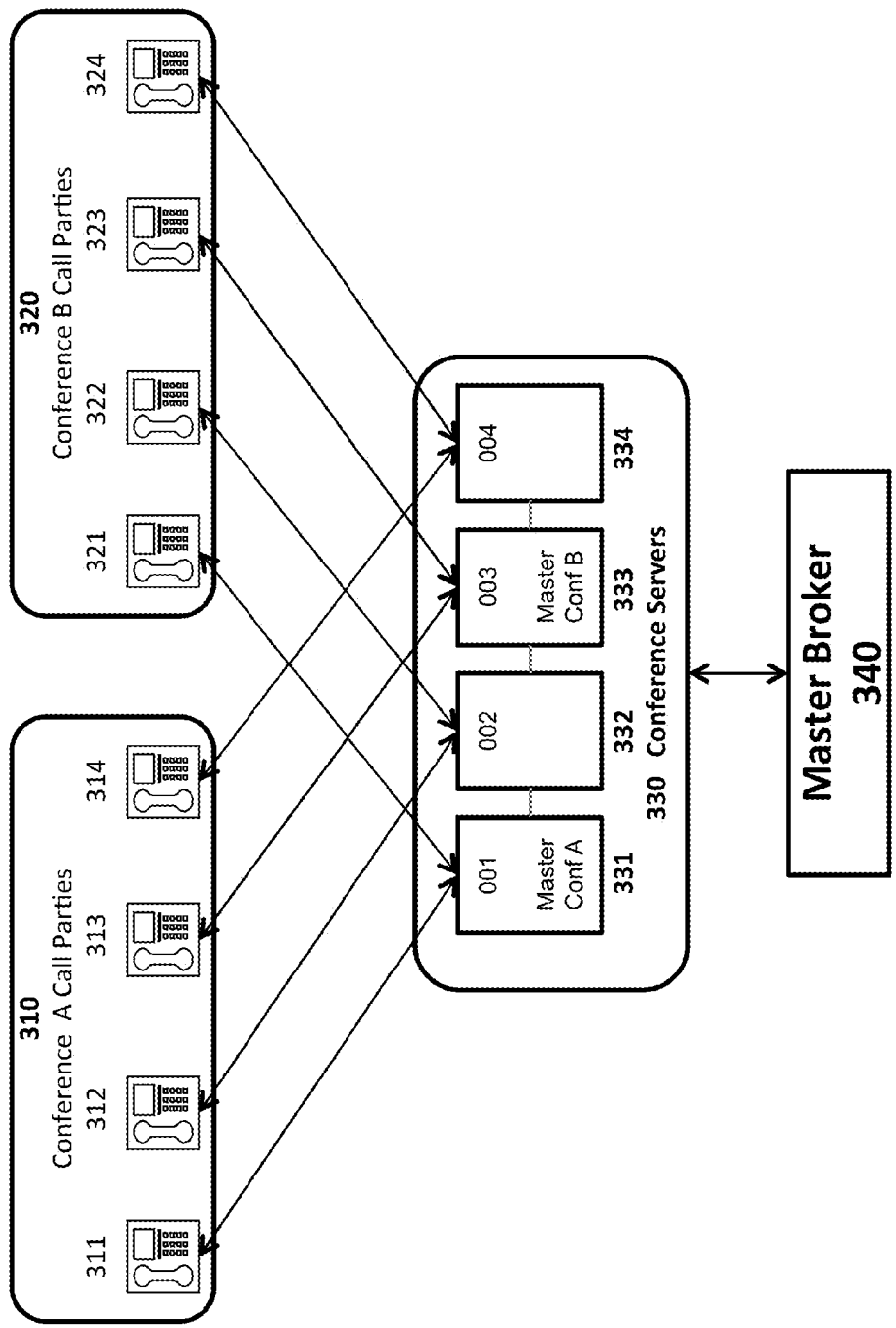
FIG. 3 is a block diagram of an exemplary embodiment of a system for dynamically selecting a conference bridge master.

Turning now to FIG. 3, a block diagram illustrating a system 300 wherein multiple conference calls may be occurring on a network using these methods is shown. In this example, a Conference A 310, comprising calling parties 311-314 is occurring while a different Conference B 320, comprising calling parties 321-324 is also occurring. In an exemplary embodiment, Conference A 310 may comprise a different type of conference call than Conference B 320. For example, Conference A 310 can comprise audio and video components within a conference call, while Conference B 320 can comprise audio, video and data components within its conference call.

The Conference Servers 330 can comprise a plurality of Conference Servers 331-334. Each of these Conference Servers 331-334 may have the same or a very different feature set. However, each of the Conference Servers 331-334 is capable of communicating with each other and all of the Conference A 310 and Conference B 320 calling parties as well as the Master Broker 340. In an exemplary embodiment, the Conference Servers 330 may have a different feature set or a different geo location.

The Master Broker 340 has access to configuration information for each of the Conference Servers 331-334 on the network. Therefore, the Master Broker 340 is aware of the location, feature set, and performance metrics of each of the Conference Servers 330. Therefore, the Master Broker 340 is capable of using its preconfigured logic to determine the optimal Master Server 140 for each conference call 310, 320. For example, the Master Broker 340 may conclude that conference servers 331, 332, and 333 have identical geo location and performance metrics; however conference servers 332 cannot handle video. The Master Broker 340 may also conclude that Conference Servers 331, 333 and 334 can handle video, audio and data. If the conference call party 311, assigned to Conference Server 331, was the first to call into the Conference A 310, the Master Broker 340 may designate Conference Server 331 as the Master Conference server for Conference A 310. Media from Call Party 311 can now be mixed on Conference Server 331; media from Call Party 312 is anchored by Conference Server 332 and mixed at Master Conference Server 331; media from Call Party 313 is anchored by Conference Server 333 and mixed at Master Conference Server 331; and media from Call Party 314 is anchored by Conference Server 334 and mixed at Master Conference Server 331.

In the exemplary embodiment in FIG. 3, Master Conference Server 331 is now managing Conference A 310, while also anchoring Conference Call Party 321, as well as, handling other typical server activities. Therefore, the Master Broker 340 may determine that Conference Server 331 is loaded. Now Calling Party 321 is the first to call in for Conference B 320. Unfortunately, Conference Server 331 is already loaded. Thus, the Master Broker 340 will see what other servers are available to serve as the Master Conference Server for Conference B 320. The Master Broker 340 may determine that Conference Server 334 cannot serve as the conference master because it is located too distant, geographically, from the majority of members of Conference B 320. The Master Broker 340 may determine that the only available conference server that is located in close geographic proximity to the members of the Conference B 320 participants and that can handle the type of media for Conference B 320 is Conference Server 333. Therefore, the Master Broker 340 may notice that Conference Server 333 is only anchoring Conference Call Party 313 at this time and can handle the load of a conference call. Therefore, the Master Broker 340 may designate Conference Server 333 as the Master Conference Server for Conference B 320. Conference Server 333 can now begin mixing the media for Conference B 320. For example, media for Conference Call Party 321 anchored on Conference Server 331 at Master Conference Server 333; media for Conference Call Party 322 anchored on Conference Server 332 at Master Conference Server 333; media for Conference Call Party 323 anchored on Conference Server 333 at Master Conference Server 333; and media for Conference Call Party 324 anchored on Conference Server 334 at Master Conference Server 333. Therefore, a communications network can include any number of configurations of conference servers and calling parties.

Embodiments herein allow conference communication services to be more efficiently provided with higher reliability and quality of service in a multi-tenant server system. Multi-tenant server systems are especially effective in VoIP communications. Multi-tenancy refers to a principle in software architecture where a single instance of the software runs on a server, serving multiple client-organizations (tenants). Multi-tenancy contrasts with multi-instance architectures where separate software instances (or hardware systems) operate on behalf of different client organizations. With a multitenant architecture, a software application is designed to virtually partition its data and configuration, and each client organization works with a customized virtual application. This virtually partitioned data and individual client organization configuration ability allows these types of multi-tenant server systems to be effective Conference Servers 120 that can serve as multi-purpose communication servers providing other communication services (e.g. video and data) to various conference call users 101-104. The communication services are sometimes provided as a simultaneous part of an audio conference call. However, these communication services can sometimes be provided to the conference call users 101-104 separate from the audio call. An example of the communication services includes the ability to record calls, wherein the call recording might be used for both conference communications and other person-to-person communications. Other communication services may include collecting analytics about the various conference calls including the length, cost, number of participants, network performance, and gathering other data metrics. Conference Servers 120 can also provide other communication services to users, such as voicemail, call screening, and call forwarding. The embodiments herein provide an efficient and reliable way to dynamically establish conference communication bridges among Conference Servers 120, allowing for a more efficient use of Conference Server 120 resources in a multi-purpose communication services, multi-tenant environment.

Figure 4:
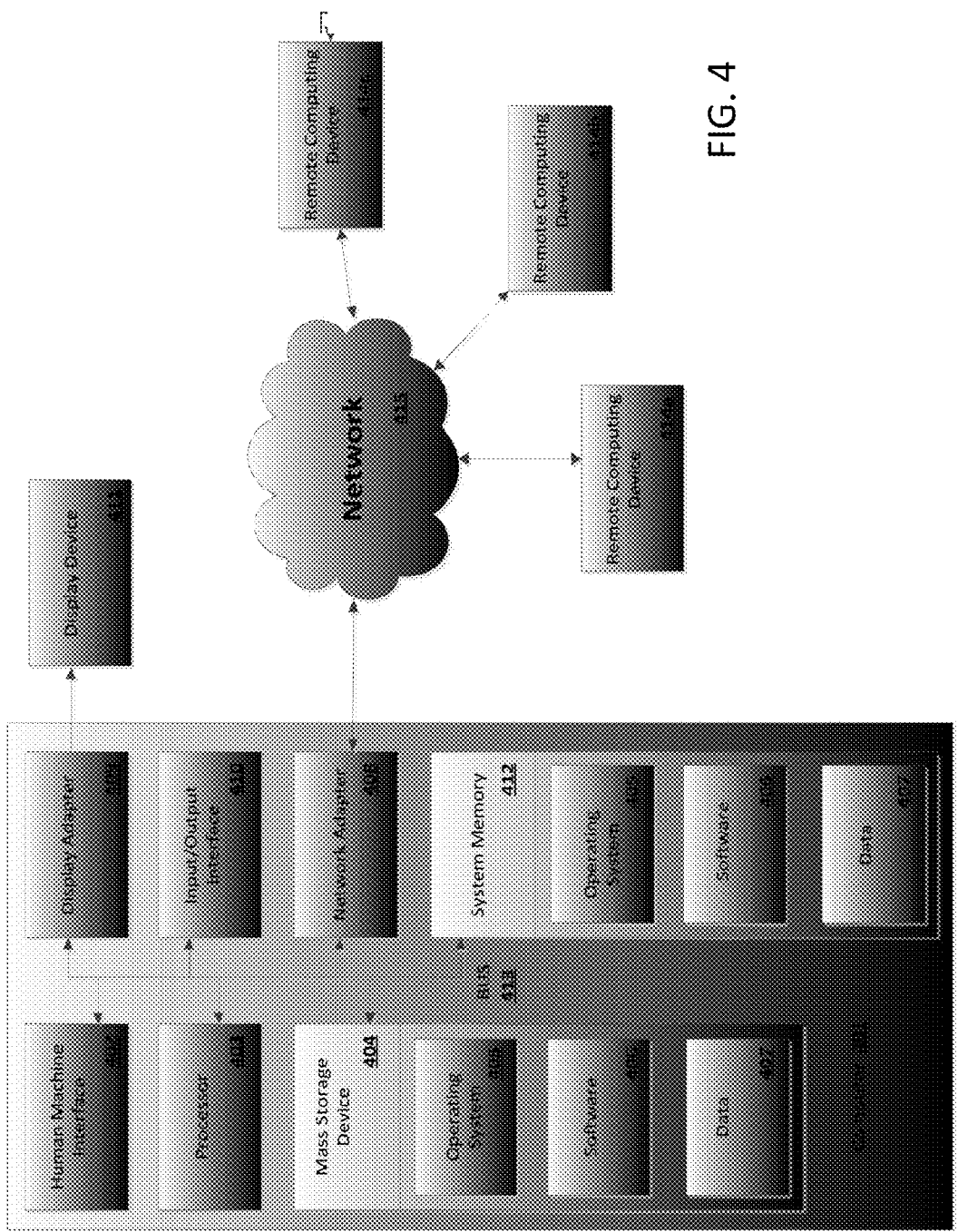
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer or computer server 401 (herein after "computer"). The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414$a,b,c$ at physically separate locations, connected through buses of this form, in effect implementing a fully distributed system.

The computer 401 typically comprises a variety of computer readable media. Exemplary readable media can be any available media that are accessible by the computer 401 and comprise, for example, both volatile and non-volatile media, as well as, removable and non-removable media. The system memory 412 comprises computer readable media in the form of volatile memory, such as random access memory (RAM), and/or non-volatile memory, such as read only memory (ROM). The system memory 412 may contain data such as media, video, audio, or other data 407 and/or program modules such as an operating system 405 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PX software 406. Both the operating system 404 and hosted VoIP PX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or Microsoft Lync® server software.

In another aspect, the user can enter commands and information into the computer 401 via client device or an input device (not shown). Example of such input devices comprise a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but also can be connected by other interface and bus structures, such as a parallel port, game port, IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, softphone, client device, a server, a router, a network computer, a peer device or other common network node, and so on. Logical connections between the computer 401 and remote computing device 414a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for selection of a conference communications master server comprising:

receiving a plurality of calls, wherein a first call of the plurality of calls contains first call media, a second call of the plurality of calls contains second call media, and the first call and the second call are each directed to a conference bridge;

connecting the first call to a first conference server of a plurality of conference servers;

connecting the second call to a second conference server of the plurality of conference servers;

dynamically selecting the first conference server of the plurality of conference servers as a master conference server based on one or more performance metrics of each of the plurality of conference servers and geolocation information for each of the plurality of conference servers;

bridging the master conference server and at least one of the plurality of conference servers not selected as the master conference server;

directing the master conference server to provide communication services including organizing and mixing the call media from the master conference server and the at least one of the plurality of conference servers not selected as the master conference server to facilitate a conference bridge communication session; and dynamically, during the conference bridge communication session, selecting as the master conference server another one of the plurality of conference servers based on one or more performance metrics of each of the plurality of conference servers and geo-location information for each of the plurality of conference servers; wherein the performance metrics of each of the plurality of conference servers include one or more quality of service metrics selected from the group consisting of minimal error rates, memory usage, and lowest jitter.

2. The method according to claim 1, wherein the one or more performance metrics of the each of the plurality of conference servers are monitored by a master broker.

3. The method according to claim 1, wherein selecting a conference server for each of the plurality of calls is determined by a call load balancing algorithm.

4. The method according to claim 1, wherein the geo-location information for each of the plurality of conference servers includes a server location relative to each user.

5. The method according to claim 1, wherein the communication services further includes call recording, call timing, call metrics gathering, and collecting call performance analytics.

6. A system for selection of a master conference server comprising:
   a plurality of conference servers for handling call media from a plurality of callers and communicatively connected to a load balancer for load balancing a plurality of calls among the plurality of conference servers;
   a master broker communicatively connected to the plurality of conference servers for dynamically selecting a master conference server, and wherein
      the master conference server is dynamically selected from among the plurality of conference servers to which the plurality calls are connected based on one or more of performance metrics of each of the plurality of conference servers and geo-location information for each of the plurality of conference servers, and wherein
      the master broker is configured for directing all others of the plurality of conference servers to bridge their call media from their respective plurality of callers to the master conference server, and wherein
      the master conference server is dynamically reselected from among the plurality of conference servers to which the plurality calls are connected based on one or more of performance metrics of each of the plurality of conference servers and geo-location information for each of the plurality of conference servers, and wherein
      the performance metrics of each of the plurality of conference servers include one or more quality of service metrics selected from the group consisting of minimal error rates, memory usage, and lowest jitter.

7. The system according to claim 6, wherein the master broker monitors performance metrics of the each of the plurality of conference servers.

8. The system according to claim 6, wherein the master broker further analyzes the load metrics of each of the plurality of conference servers to select the master conference server.

9. The system according to claim 6, wherein the geo-location information for each of the plurality of conference servers includes a server location relative to each user.

10. The system according to claim 6, wherein the selection of the master conference server by the master broker further depends on each individual conference server's set of features from among the plurality of conference servers.

11. A system for selection of a master conference server in a voice over Internet protocol (VoIP) communication comprising:
   a plurality of conference servers;
   a load balancer communicatively connected to the plurality of conference servers for balancing a plurality of calls among the plurality of conference servers, wherein
      each of the plurality of calls contains call media; and
   a master broker for dynamically selecting a master conference server from among the plurality of conference servers based on one or more of performance metrics of each of the plurality of conference servers and geo-location information for each of the plurality of conference servers; and for directing all others of the plurality of conference servers to bridge their calls containing call media to the master conference server;
   the master conference server configured for organizing and mixing the call media from each of the plurality of conference servers to facilitate a conference bridge communication session; and
   the master conference server is configured to dynamically select another of the plurality of conference servers as the master conference server based on one or more performance metrics of each of the plurality of conference servers and geo-location information for each of the plurality of conference servers,
   wherein the performance metrics of each of the plurality of conference servers include one or more quality of service metrics selected from the group consisting of minimal error rates, memory usage, and lowest jitter.

12. The system according to claim 11, wherein the geo-location information for each of the plurality of conference servers includes a server location relative to each user.

* * * * *